E. A. HALL.
FRUIT BOILER.
APPLICATION FILED JUNE 29, 1908.

919,346.

Patented Apr. 27, 1909.
2 SHEETS—SHEET 1.

Witnesses
J. C. Miller
B. E. Hutton

Inventor
E. A. Hall,
By D. Swift & Co.
Attorneys

E. A. HALL.
FRUIT BOILER.
APPLICATION FILED JUNE 29, 1908.

919,346.

Patented Apr. 27, 1909.
2 SHEETS—SHEET 2.

Witnesses
J. C. Miller
B. E. Hutton

Inventor
E. A. Hall,
By D. Swift & Co.
Attorneys

UNITED STATES PATENT OFFICE.

ELIZABETH A. HALL, OF EDGAR, NEBRASKA.

FRUIT-BOILER.

No. 919,346.     Specification of Letters Patent.     Patented April 27, 1909.

Application filed June 29, 1908. Serial No. 440,965.

*To all whom it may concern:*

Be it known that I, ELIZABETH A. HALL, a citizen of the United States, residing at Edgar, in the county of Clay and State of Nebraska, have invented a new and useful Fruit-Boiler; and I do hereby declare the following to be a full, clear, and exact description of the invention, such as will enable others skilled in the art to which it appertains to make and use the same.

The invention relates to a fruit boiler and has for its object to provide a simple, efficient and durable device of this character especially adapted for the use of cooking fruit in cans. It will also be seen that this device is most conveniently adapted for the use of cooking any kind of vegetable as well as fruit in cans.

With these and other objects in view, the invention consists in the novel construction and arrangement of parts hereinafter described and shown and particularly pointed out in the appended claim.

Figure 1:
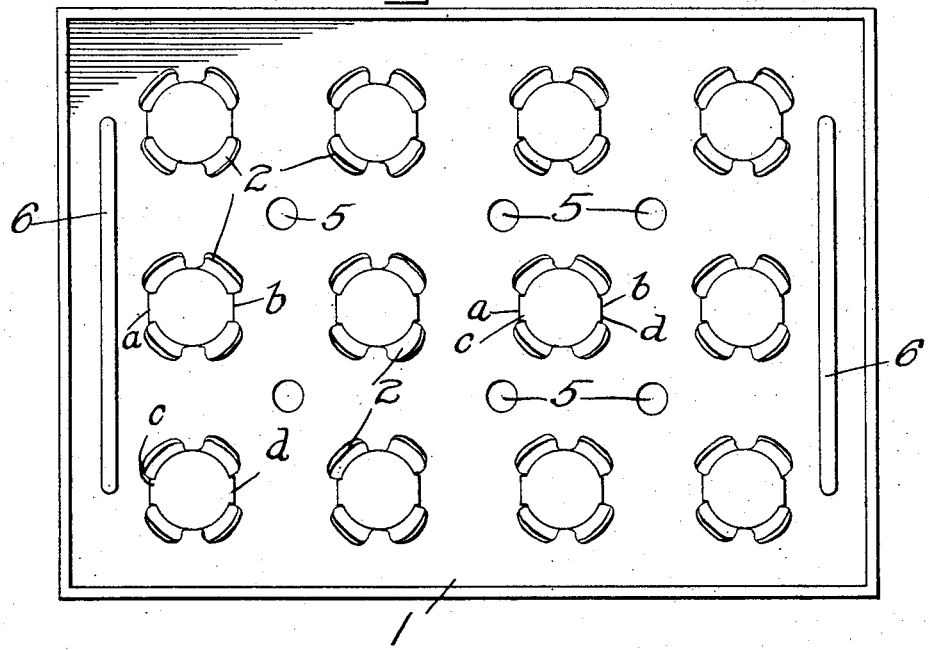
Figure 2:
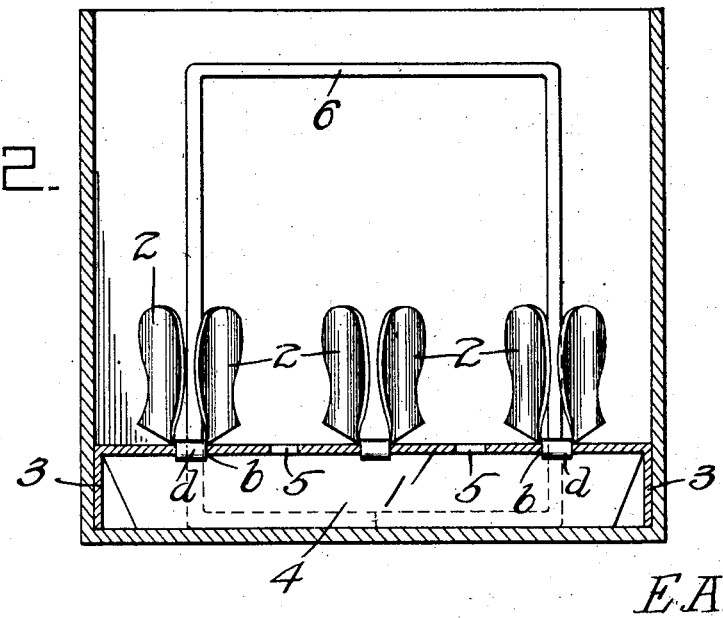
Figure 3:
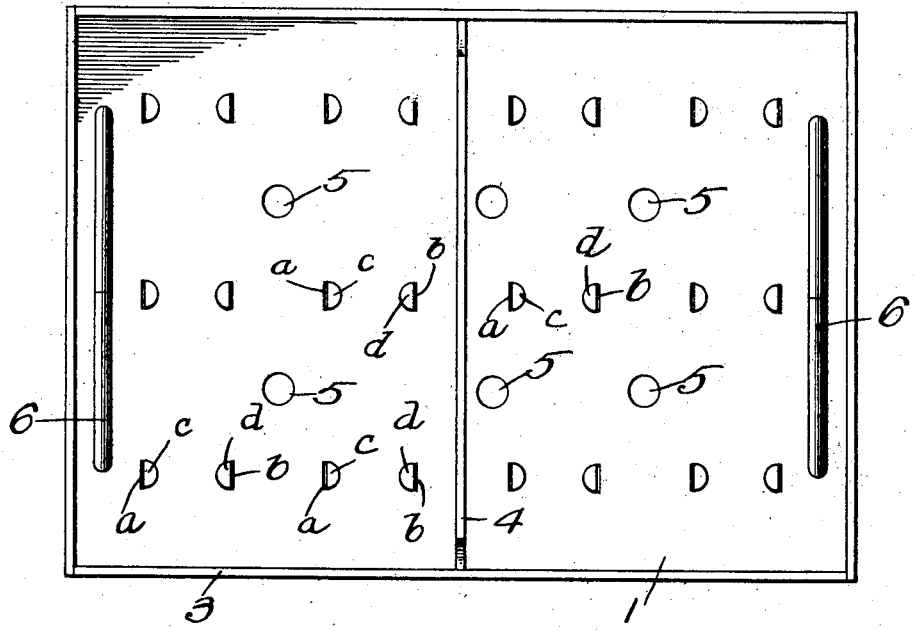
Figure 4:
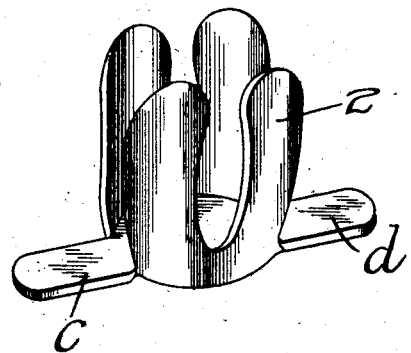

In the drawings Figure 1 is a plan view of a fruit boiling apparatus constructed in accordance with this invention. Fig. 2 is a transverse sectional view through the device. Fig. 3 is an inverted plan view. Fig. 4 is a perspective view of one of the can holders.

Referring to the drawings 1 designates a plate which is formed of any suitable metal and which is provided with series of pairs of slots *a* and *b*. Inserted in each pair of slots is an ear *c* and *d* which constitutes the fastening means for each of the can holders. The ears *c* and *d* are passed through the slots and then bent inwardly, as shown in Fig. 2 of the drawings. The arms 2 of the can holder are then bent upward and are yieldable and resilient so as to frictionally engage the can that is inserted therein. The under side of the plate is provided with a rectangular flange 3 which has a central support 4 which holds the plate a proper distance from the vessel containing the same. The plate is also provided with a series of perforations 5, as clearly shown in Fig. 1 of the drawings. The plate is provided with a loop or handle 6 which is rigidly connected thereto, and which extends below said plate for the purpose of holding the same spaced from the bottom of the vessel in which it is inserted.

Having thus described my invention, what is claimed is:—

A fruit boiler, comprising a plate mounted in a vessel, said plate being provided with a plurality of slots or openings arranged in pairs, can-holding devices having ears mounted in said slots or openings, the extremities of said ears being bent inwardly below said plate, said can-holders being composed of a single piece of metal comprising circular bases from which the said ears project, each of said bases having upwardly projecting spring-arms designed to frictionally engage a can, said arms being of a contour to conform to the curvature of a can, handles carried by said plate and rigidly connected thereto, said handles being extended below said plate and adapted to hold the same spaced from the bottom of the vessel.

In testimony whereof I have signed my name to this specification in the presence of two subscribing witnesses.

ELIZABETH A. HALL.

Witnesses:
JOHN M. JONES,
MAGGIE HILL.